April 27, 1926.
H. E. DURKEE
1,582,669
SCREW THREAD CUTTING MEANS FOR BENCH LATHES
Filed Feb. 5, 1923  3 Sheets-Sheet 1
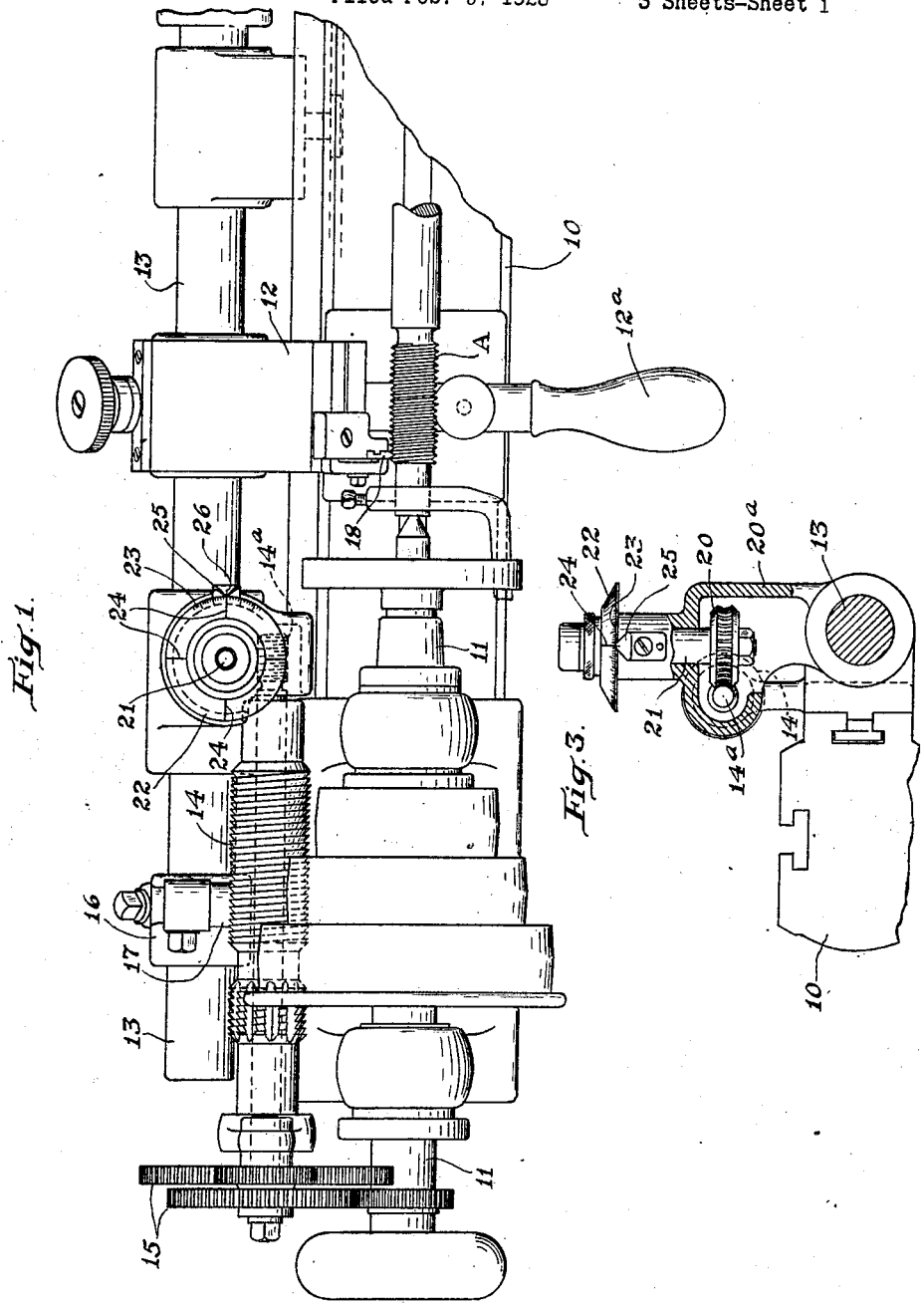
INVENTOR
H. E. Durkee
BY Joseph N. Schofield
ATTORNEY.

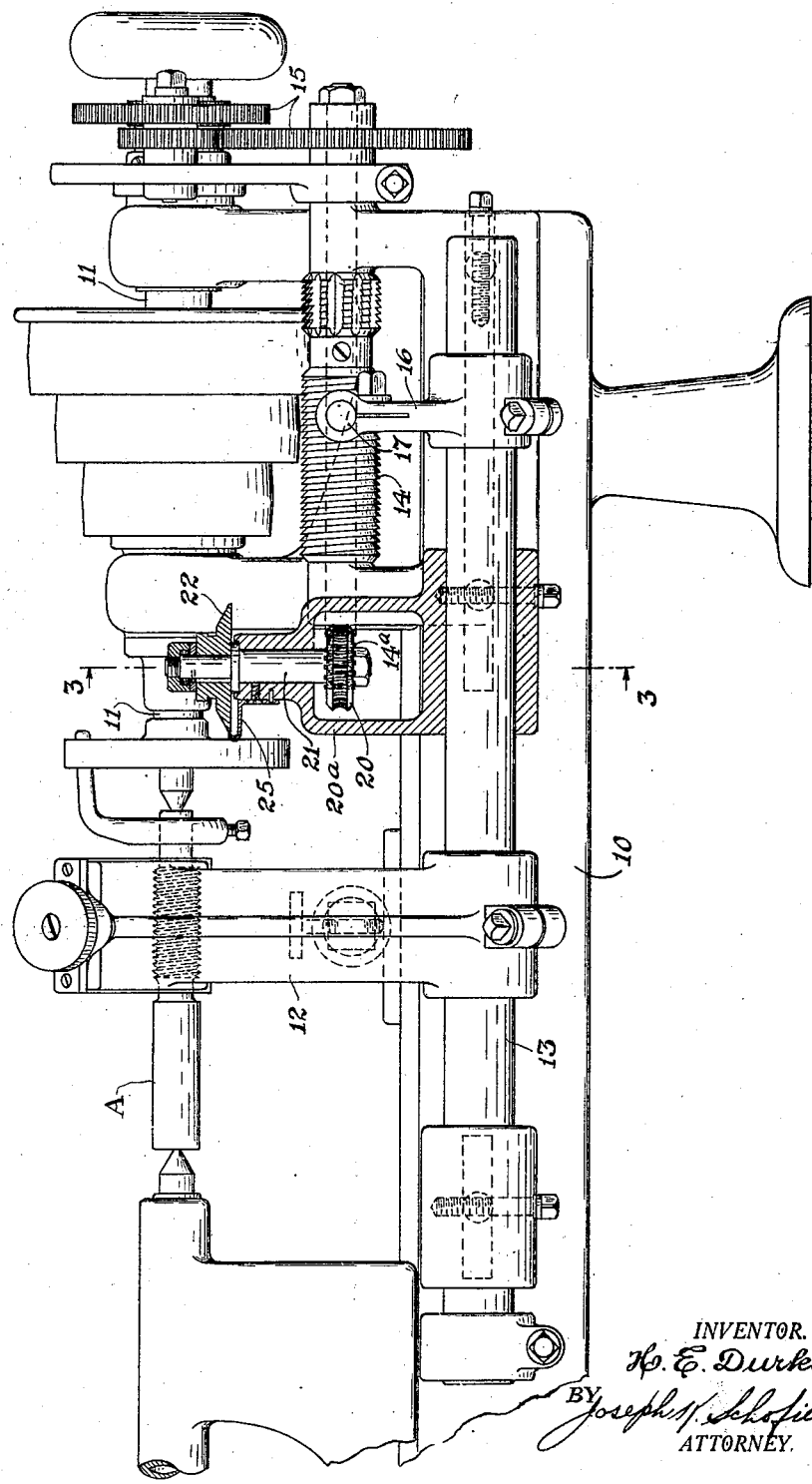

April 27, 1926.
H. E. DURKEE
1,582,669
SCREW THREAD CUTTING MEANS FOR BENCH LATHES
Filed Feb. 5, 1923    3 Sheets-Sheet 3
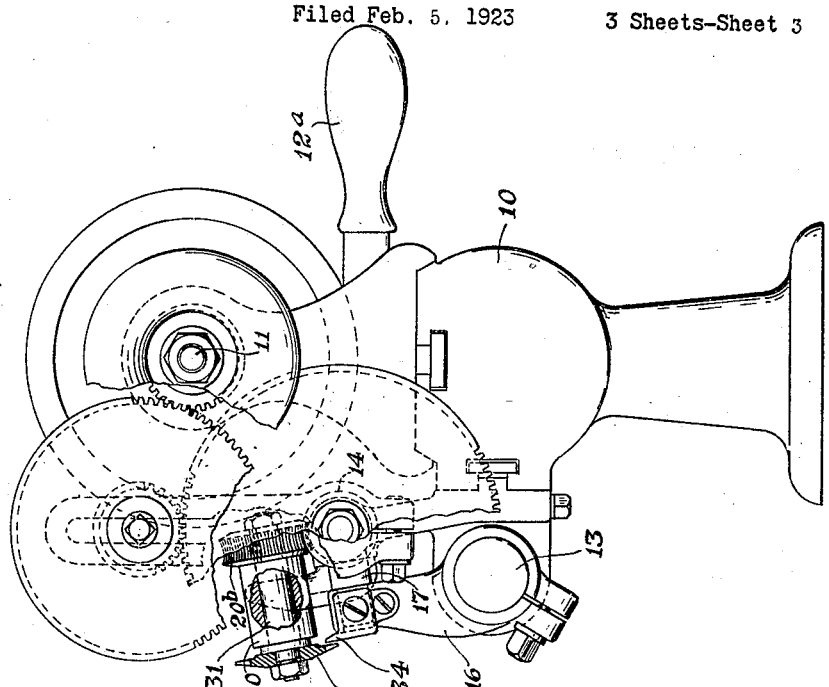
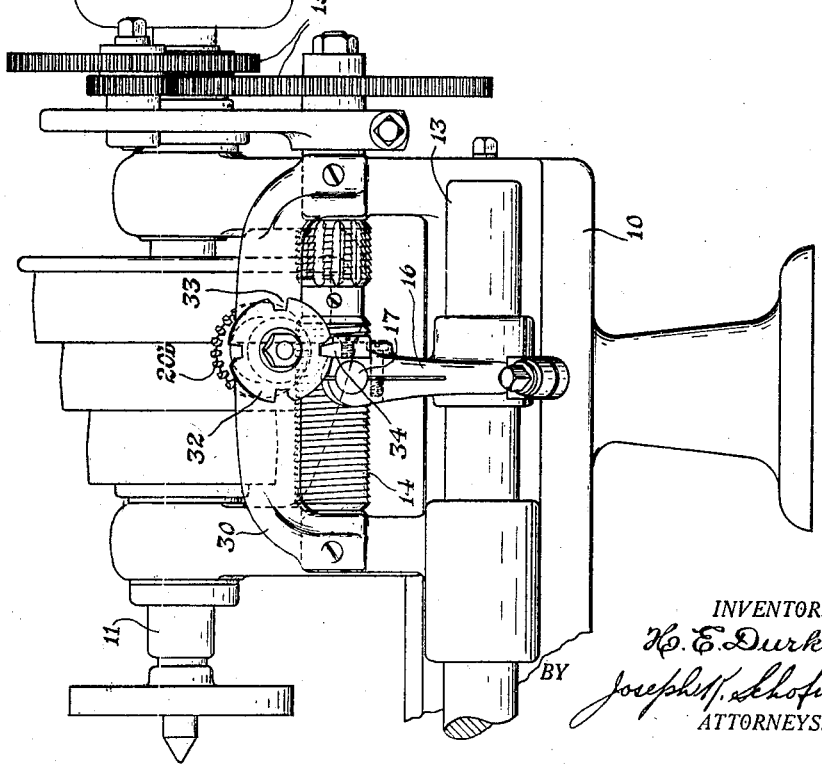
INVENTOR.
H. E. Durkee
BY Joseph T. Schofield
ATTORNEYS.

Patented Apr. 27, 1926.                                                              1,582,669

UNITED STATES PATENT OFFICE.

HENRY E. DURKEE, OF GLASTONBURY, CONNECTICUT, ASSIGNOR TO PRATT & WHITNEY COMPANY, OF NEW YORK, N. Y., A CORPORATION OF NEW JERSEY.

SCREW-THREAD-CUTTING MEANS FOR BENCH LATHES.

Application filed February 5, 1923. Serial No. 617,037.

*To all whom it may concern:*

Be it known that I, HENRY E. DURKEE, a citizen of the United States, residing at Glastonbury, in the county of Hartford and State of Connecticut, have invented certain new and useful Improvements in Screw-Thread-Cutting Means for Bench Lathes, of which the following is a specification.

This invention relates to lathes and in particular to an improved form of screw thread cutting device adapted to be used in connection with a bench type of lathe.

An object of the present invention is to provide means enabling screw threads to be cut in a bench lathe at a high rate of speed, and without danger of the threads being mutilated by incorrect engagement of the follower controlling the longitudinal movements of the threading tool with the lead screw rotated from the work spindle at different speeds.

More particularly it is an object of the invention to provide means to properly engage the follower with the lead screw so that with successive cutting operations of the tool, the follower will be in engagement with the same convolution of the thread on the lead screw and the tool will successively engage and progressively form the screw thread being cut.

One of the features of the invention which is advantageous is that screw threads having any lead or pitch can be cut by means of a single lead screw driven from the headstock spindle through appropriate geared change speed mechanism.

In one of the modifications of the invention the lead screw, through geared connections, rotates a dial provided with a plurality of graduations. The positions of the graduations on the dial relative to a fixed point adjacent the dial indicate exactly when the follower carried by and movable with the tool carriage is to be manually engaged with the threads of the lead screw. In the second modification of the invention, the follower is positively held out of engagement with the threads of the lead screw until exactly the proper time for it to engage the lead screw, and, at that time only it is permitted to be oscillated into engagement therewith.

With these and other objects in view, my invention consists in the features of construction and operation set forth in the following specification and illustrated in the accompanying drawings.

In the accompanying drawings annexed hereto and forming a part of this specification, I have shown my invention embodied in a well known type of bench lathe, the drawings, however, are not to be construed as defining or limiting the scope of the invention, the claims appended to this specification being relied upon for that purpose.

In the drawings:

Figure 1 is a plan view of a bench lathe having one of the forms of the present invention applied thereto.

Fig. 2 is a rear elevation of the machine shown in Fig. 1, parts being broken away to more clearly indicate their construction.

Fig. 3 is a sectional view taken on line 3—3 of Fig. 2 showing the graduated dial and its means of attachment to the lead screw.

Fig. 4 is a rear elevation similar to Fig. 2 but showing a modified form of the present invention.

Fig. 5 is an end elevation of the form shown in Fig. 4, parts being broken away to more clearly show their construction.

In the above mentioned drawings, I have shown several modifications of the invention which are now deemed preferable but it will be understood that changes and modifications may be made within the scope of the appended claims without departing from the spirit of the invention.

Referring more particularly to the drawings, my invention in its broadest aspect is adapted to be applied to a lathe having the following principal parts: first, a base 10 having work supporting and rotating means 11, that shown being the usual form of work supporting and rotating spindle, and an oscillating tool holder 12 preferably mounted in the usual manner upon an oscillating and longitudinally moving shaft 13 in rear of the base of the lathe. Also, the lathe has a lead screw 14 extending parallel to the work supporting and rotating spindle 11 and adapted to be driven therefrom at any predetermined ratio thereto by suitable change gearing 15. In addition, the oscillating shaft 13, to which the tool holder 12 is attached, is also provided with an arm 16 having a follower 17 adapted to engage the lead screw 14. All of the above parts are those usually found in bench lathes having screw thread cutting attachments and my present invention relates to improvements adapted to be used directly in connection therewith.

These improvements comprise means rotated from the lead screw 14 and at a given fixed ratio thereto. These means in one modification are provided with indicia and in the other with spaced apertures, the purposes of each of which will be presently described. In both modifications, the oscillating shaft 13 is provided with the member 17 adapted in its operative position to engage in said lead screw and thus cause the tool 18 and its carriage 12 to move axially, and, in one modification this follower carrying arm 16 has a projection mounted thereon positioned adjacent the member rotated by the spindle 11.

It is the usual practice in cutting screw threads in a bench lathe to oscillate the tool holding frame 12 as by means of a handle 12$^a$ in a manner to engage and disengage a tool 18 with the work A. This engagement and disengagement in usual practice takes place while the work is constantly rotating in one direction. By means of the follower 17 on arm 16 attached to the shaft 13 which is engaged and disengaged with the lead screw 14, oscillation of this tool holder 12 gives the tool holder 12 an axial movement. This axial movement of the tool 12, which takes place while it is in engagement with and during the rotation of the work A, forms the screw thread. It has been found in practice that, when screw threads are being formed and while the work is being rapidly rotated, the threads may be mutilated by the incorrect engagement of the follower 17 with the lead screw 14. It will be undersood that if the lead of the work being threaded is incommensurate with the lead of the lead screw, the follower must engage a particular convolution of the threads of the lead screw during each of the successive cutting operations. To enable this to be done expeditiously and without stopping rotation of the work A and lead screw 14, I mount the mechanism forming the present invention upon and in position to be driven by the lead screw.

In both of the embodiments of the present invention which have been illustrated, the lead of the screw 14 is one-twelfth of an inch and the worm wheel 20 driven thereby is provided with forty-eight teeth. These may be widely varied, it being essential merely that the number of teeth on the worm wheel 20 should have a large number of factors. In the modification shown in Figs. 1, 2 and 3 in which the worm wheel 20 is driven from an extension of the screw 14, the lead of the worm 14$^a$ on this extension corresponds exactly with the lead of the main screw 14. The tool support 12 with its tool 18 will therefore be advanced four inches with one complete rotation of the worm wheel 20.

In the modification of the invention illustrated in Figs. 1, 2 and 3, I provide a vertical shaft 21 preferably secured in a suitable housing 21$^a$ which may be rigidly attached to the lathe bed 10. This vertical shaft 21 at its lower end is provided with the worm wheel 20 previously referred to, the teeth of which are adapted to engage with the worm 14$^a$ formed on the end of the shaft carrying the lead screw 14. This worm 14$^a$, as above stated, has the same lead as the lead screw 14. It will be seen from this construction that rotation of the work A and lead screw 14 will constantly rotate the worm wheel 20 and the vertical shaft 21 so that a dial 22 or plate detachably fastened to the upper end of the shaft 21 is constantly rotated.

On this dial or plate 22 are graduations 23, there being preferably four major graduations 24 and as many individual graduations as there are teeth in the worm wheel. Adjacent the periphery of this dial 22 is a projection 25 carrying a zero line 26. This may be attached as shown to the housing 21$^a$. When it is desired to make use of this mechanism, it is only necessary to observe the relative positions of the indicia 24 on the dial 22 at the time the follower 17 carried by the oscillating shaft 13 is oscillated to its engaged position with the lead screw 14. This engagement in successive cuts upon the work A must take place while one of the major graduations 24 is just passing the zero line. This will assure the tool being engaged correctly in proper relation to the thread being cut as it will assure the follower 17 engaging the same convolution of the lead screw 14 at the start of the thread. Under certain conditions as when the number of threads being cut per inch is fractional as 11½—13½ then the number of major graduations 23 on the dial 22 must be changed accordingly.

As the work usually done in bench lathes to which my invention is particularly applicable is of small diameter and consequently rotates at high speed, it is difficult to properly engage the follower 17 with the lead screw 14 exactly at a time when one of the major indicia 24 is passing the zero line 26. I, therefore, in Figs. 4 and 5, show a modified form of the invention which prevents any engagement of the follower 17 with the lead screw 14 and consequently prevents the tool engaging the work until proper relative positions of the parts occur.

In this form of the invention, the lead screw 14 and its driving means from the work spindle 11 as well as the oscillating shaft 13 and attached parts are exactly the same as in the previously described form. The worm wheel 20 however may preferably directly engage the lead screw 14 rather than through a worm 14ª of the same lead attached or formed thereon.

Referring to Figs. 4 and 5, it will be seen that a form of support 30 is mounted upon the headstock and that a shaft 31 is rotatably carried thereby. This shaft 31 has near one end a worm wheel 20ᵇ, which may have exactly the same number of teeth as worm wheel 20 but adapted to directly engage the screw threads of the lead screw 14. At the opposite end of this rotating shaft 31 is a plate 32 detachably mounted thereon and having a plurality of notches 33 therein, which plate 32, it will be seen, is positively driven so long as the lead screw 14 is rotating.

Extending from the oscillating arm 16 carrying the follower 17 is a small finger member 34, the over-hanging end of which lies adjacent the notched plate 32. This projection or finger 34 may be detachably secured, as shown, to one side of this arm 16. It will be seen from the above that when it is attempted to oscillate the arm 16 and so bring the follower 17 into contact with the lead screw 14, the projection 34 on the arm 16 will ride upon the outer surface of the rotating notched plate 32 until one of the notches 33 is in a position directly under it at which time the arm 16 can be oscillated so that the projection will pass through one of the notches 33 in the plate 32. In this oscillated position the follower 17 is placed in engagement with the lead screw 14 and the tool 18 is in cutting position relative to the work.

The number of notches 33 in the plate are shown as being four. It will be understood however that this number may be varied with the requirements of the threads being cut.

What I claim is:

1. A screw thread cutting attachment for lathes having a lead screw and an oscillating and axially movable tool controlled by a follower engaging said lead screw, comprising in combination, a rotatably mounted member disposed at right angles to said lead screw adapted to be driven therefrom, and spaced means about the periphery of said member to enable the follower to be manually oscillated and engaged with the lead screw when the tool and work are in predetermined exact relative positions.

2. A screw thread cutting attachment for lathes having a lead screw and an oscillating and axially movable tool controlled by a follower engaging said lead screw, comprising in combination, a member adapted to be rotated in timed relation to said lead screw, a member thereon having a cut-away portion, and a projection on said oscillating follower adapted, when said member is in predetermined positions, to permit oscillation of said follower into engagement with said lead screw.

3. A screw thread cutting attachment for lathes having a lead screw and an oscillating and axially movable tool controlled by a follower engaging said lead screw, comprising in combination, a member adapted to be rotated in timed relation to said lead screw, a member thereon having equally spaced cut-away portions, and a projection on said oscillating follower adapted, when said member is in predetermined positions, to permit oscillation of said follower into engagement with said lead screw.

4. A screw thread cutting attachment for lathes having a lead screw and an oscillating and axially movable tool controlled by a follower engaging said lead screw, comprising in combination, a member adapted to be rotated in timed relation to said lead screw, a member thereon having a plurality of equally spaced cut-away portions, and a projection on said oscillating follower adapted, when said member is in predetermined positions, to pass through the cut-away portions of the member and permit oscillation of said follower into engagement with said lead screw.

5. A screw thread cutting attachment for lathes having a lead screw and an oscillating and axially movable tool controlled by a follower engaging said lead screw, comprising in combination, a member adapted to be rotated at a reduced speed and in timed relation to said lead screw, a member thereon having spaced cut-away portions, and a projection on said oscillating follower adapted to contact with the face of the member and when said member is in predetermined positions to permit oscillation of said follower into engagement with said lead screw.

6. A screw thread cutting device for lathes comprising in combination, a lead screw adapted to be attached to said lathe and rotated by a work rotating spindle, means to vary the rotation of said lead screw relative to the spindle, an oscillating shaft mounted for axial movement and extending longitudinally of the lathe, a tool supporting carriage mounted thereon and adapted upon oscillation to engage a tool with the work, means also mounted on said oscillating shaft adapted when the shaft is oscillated to its operative position to engage a follower with the lead screw, and means engaging and rotated by said lead screw permitting oscillation of said shaft to engage the tool with the work in predetermined relative positions only of the lead screw and follower.

7. A screw thread cutting device for lathes comprising in combination, a lead screw adapted to be attached to said lathe and rotated by a work rotating spindle, means to vary the rotation of said lead screw relative to the spindle, an oscillating shaft mounted for axial movement and extending longitudinally of the lathe, a tool supporting carriage mounted thereon and adapted upon oscillation to engage a tool with the work, means also mounted on said oscillating shaft adapted when the shaft is oscillated to its operative position to engage a follower with the lead screw, and a notched plate rotated by said lead screw permitting oscillation of said shaft to engage the tool with the work when one of the notches in said plate is rotated to a position in alignment with a projection carried by said follower.

8. A screw thread cutting device for lathes comprising in combination, a lead screw adapted to be attached to said lathe and rotated by a work rotating spindle, means to vary the rotation of said lead screw relative to the spindle, an oscillating shaft mounted for axial movement and extending longitudinally of the lathe, a tool supporting carriage mounted thereon and adapted upon oscillation to engage a tool with the work, means also mounted on said oscillating shaft adapted when the shaft is oscillated to its operative position to engage a follower with the lead screw, and a plate having notches therein rotated by said lead screw and permitting oscillation of said shaft to engage the tool with the work in predetermined relative positions only and when one of said notches is in alignment with a projection adjacent the follower.

In testimony whereof, I hereto affix my signature.

HENRY E. DURKEE.